(12) United States Patent
Maric et al.

(10) Patent No.: US 11,365,719 B2
(45) Date of Patent: Jun. 21, 2022

(54) POWER PRODUCTION FORECASTING FOR A WIND TURBINE

(71) Applicant: VESTAS WIND SYSTEMS A/S, Aarhus N (DK)

(72) Inventors: Tomislav Maric, Skødstrup (DK); Martin Qvist, Højbjerg (DK); Line Storelvmo Holmberg, Kjellerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/251,582

(22) PCT Filed: May 27, 2019

(86) PCT No.: PCT/DK2019/050167
§ 371 (c)(1),
(2) Date: Dec. 11, 2020

(87) PCT Pub. No.: WO2019/238185
PCT Pub. Date: Dec. 19, 2019

(65) Prior Publication Data
US 2021/0254600 A1 Aug. 19, 2021

(30) Foreign Application Priority Data
Jun. 11, 2018 (DK) .............................. PA 2018 70344

(51) Int. Cl.
*F03D 9/00* (2016.01)
*H02P 9/04* (2006.01)
(Continued)

(52) U.S. Cl.
CPC ............. *F03D 7/048* (2013.01); *F03D 7/028* (2013.01); *F05B 2260/8211* (2013.01);
(Continued)

(58) Field of Classification Search
CPC ..................... F03D 7/028; F03D 7/048; F05B 2260/8211; F05B 2270/303;
(Continued)

(56) References Cited

U.S. PATENT DOCUMENTS

| 7,898,100 B2 * | 3/2011 | Andersen | F03D 7/0276 290/44 |
| 9,337,656 B2 * | 5/2016 | Westergaard | H02J 3/381 |
| 2010/0332272 A1 * | 12/2010 | Ong | F03D 17/00 705/7.36 |
| 2011/0004356 A1 * | 1/2011 | Garcia | F03D 7/046 700/287 |

(Continued)

FOREIGN PATENT DOCUMENTS

| EP | 1906353 A1 | 4/2008 |
| EP | 2672111 A2 | 12/2013 |

(Continued)

OTHER PUBLICATIONS

Danish Patent and Trademark Office 1st Technical Examination Report for Application No. PA 2018 70344 dated Dec. 12, 2018.
PCT Notification of Transmittal of the International Search Report and the Written Opinion of the International Searching Authority, or the Declaration for Application No. PCT/DK2019/050167 dated Aug. 16, 2019.

*Primary Examiner* — Tulsidas C Patel
*Assistant Examiner* — Thomas K Quigley
(74) *Attorney, Agent, or Firm* — Patterson + Sheridan, LLP

(57) ABSTRACT

A method for forecasting power production of at least one wind turbine, the wind turbine forming part of a wind farm arranged at a site. Global weather forecast data is received at a central data centre. A site specific forecast is then generated at the central data centre, based on the global weather forecast data. The site specific forecast from the
(Continued)

central data centre is sent to a local data centre, e.g. arranged at the site of the wind farm. Site specific data is received at the local data centre and comprises site specific weather data and/or site specific wind turbine data measured at the site. The site specific forecast is then updated at the local data centre, using the site specific data. Finally, a power production forecast of the at least one wind turbine is generated based on the updated site specific forecast.

16 Claims, 3 Drawing Sheets

(51) Int. Cl.
    *F03D 7/04*         (2006.01)
    *F03D 7/02*         (2006.01)

(52) U.S. Cl.
    CPC .............. *F05B 2270/303* (2013.01); *F05B 2270/327* (2013.01); *F05B 2270/328* (2013.01); *F05B 2270/335* (2013.01)

(58) Field of Classification Search
    CPC .......... F05B 2270/327; F05B 2270/328; F05B 2270/335
    See application file for complete search history.

(56) References Cited

U.S. PATENT DOCUMENTS

| | | | |
|---|---|---|---|
| 2011/0115224 A1* | 5/2011 | Lausen | F03D 7/0224 290/44 |
| 2012/0046917 A1 | 2/2012 | Fang et al. | |
| 2014/0244188 A1 | 8/2014 | Bai et al. | |
| 2014/0324495 A1* | 10/2014 | Zhou | G06Q 10/20 705/7.13 |
| 2015/0278405 A1* | 10/2015 | Andersen | G06F 30/20 703/18 |

FOREIGN PATENT DOCUMENTS

| | | |
|---|---|---|
| WO | 2018095494 A1 | 5/2018 |
| WO | 2019238185 A1 | 12/2019 |

\* cited by examiner

POWER PRODUCTION FORECASTING FOR A WIND TURBINE

FIELD OF THE INVENTION

The present invention relates to a method for forecasting power production of at least one wind turbine forming part of a wind farm arranged at a site.

BACKGROUND OF THE INVENTION

Power production by wind turbines is one of the inexhaustible alternatives of energy generation. In order to incorporate wind turbines into a power grid, it is necessary to predict power production of wind turbines. For instance, an accurate wind farm power production forecast is of a high importance for the stability of the power grid. Power production forecast can, e.g., be based on wind speed and regime forecast, but may also rely on systematic data collection related to the wind farm. Furthermore, it is preferred that wind forecast is related to the exact site where the wind farm, or a particular wind turbine is arranged. In addition to wind forecast and wind farm data, an accurate and reliable model for calculating power production is needed.

DESCRIPTION OF THE INVENTION

It is an object of embodiments of the invention to provide a method for accurate prediction of power production of a wind turbine and/or a wind farm arranged at a site.

It is a further object of embodiments of the invention to provide a method for prediction of power production of a wind turbine and/or wind farm with a high time resolution.

According to a first aspect, the invention provides a method for forecasting power production of at least one wind turbine, the wind turbine forming part of a wind farm arranged at a site, the method comprising the steps of:
  receiving global weather forecast data at a central data centre, the central data centre being arranged remotely from the site of the wind farm;
  generating a site specific forecast at the central data centre, based on the global weather forecast data, the site specific forecast being a site specific weather forecast and/or a site specific power production forecast related to the site of the wind farm;
  sending the site specific forecast from the central data centre to a local data centre;
  receiving site specific data at the local data centre, the site specific data comprising site specific weather data and/or site specific wind turbine data measured at the site;
  updating the site specific forecast at the local data centre, using the site specific data; and
  generating a power production forecast of the at least one wind turbine, based on the updated site specific forecast.

Thus, the method according to the first aspect of the invention is a method for forecasting power production of at least one wind turbine.

In the present context the term 'forecasting power production' should be interpreted to mean estimation of power to be produced in near future, e.g., in maximum several hours, by a wind turbine or wind farm. It is a prediction of how much power will be generated by a wind turbine or wind farm under given conditions.

In the present context, the term 'wind farm' should be interpreted to mean a group of at least two wind turbines sharing infrastructure for power transmission to a power grid. The wind turbines of the wind farm may be arranged at a geographical site and are preferably controlled by at least one control unit. A part of the wind turbine group may be controlled by one control unit, while another part of the wind turbine group may be controlled by another controller. Each wind turbine of the wind farm converts mechanical wind energy into electric energy. The wind farm is typically connected to a power grid supplying generated electric energy.

In the present context the term 'site' should be interpreted to mean a geographical area where the wind farm is arranged.

According to the method of the first aspect of the invention, global weather data is initially received at a central data centre. The central data centre is arranged remotely from the site of the wind farm, and it may handle data related to several wind farms arranged at various sites on a global scale. Accordingly, there may be a significant distance between the site of the wind farm and the location of the central data centre. The central data centre may be in possession of various data or information relating to the wind farms which it is in communication with, such as wind farm location, configuration, operation, statistical historical data about power production of each wind farm, etc.

The global weather forecast data may include meteorological data on a global scale. The global weather forecast data may be provided by one or more public and/or commercial weather forecast providers. Such providers will typically update their forecasts on a timescale of several hours, e.g. every 4-5 hours or up to every 12 hours. The global weather data may be based on satellite data and/or data obtained from several meteorological stations arranged at various globally distributed sites. The global weather forecast data may, thus, comprise forecasted wind speed, wind direction, air temperature, air humidity, air pressure, and similar parameters on a global scale, including such data related to the geographical area where the wind farm is arranged.

Next, the central data centre generates a site specific forecast based on the global weather forecast data. The site specific forecast includes a site specific weather forecast and/or site specific power production forecast. The site specific forecast is related to the site where the wind farm of interest is. The site specific forecast may be generated by use of different parameters related to the wind farm and which are stored at the central data centre. Further, the site specific forecast may be based on data from the site, such as wind speed and direction, temperature, etc. It may also be based on a regional weather forecast. The regional weather forecast may be generated by use of numerical weather prediction models in the central data centre, and using global weather forecast, and optionally site specific data as an input to the numerical models. The regional weather forecast may have higher spatial (horizontal and vertical) and temporal resolution than the global weather forecasts. Use of the regional weather forecast may especially be beneficial for sites with complex topography or weather and climate conditions. Thus, at the central data centre, weather data related to the site of the wind farm is extracted from the global weather forecast, and based on this a site specific forecast, i.e. a forecast which relates specifically to the site of the wind farm, is generated. The site specific forecast relates to weather at the site of the wind farm and/or to power production of the wind turbines of the wind farm.

Since the site specific forecast is based on the global weather forecast, the time resolution of the site specific forecast corresponds to the time resolution of the global weather forecast, i.e. the time resolution is typically several hours, such as 1 to 6 hours. However, the site specific forecast takes the global weather data into account, and handling of the global weather data takes place at the central data centre.

The site specific forecast is then sent from the central data centre to a local data centre. In the present context the term 'local' should be interpreted to mean locally with respect to the site of the wind farm. Accordingly, the local data centre is arranged near the wind farm, e.g. at the site of the wind farm or within an acceptable distance therefrom. In any event, the local data centre is arranged significantly closer to the site of the wind farm than the central data centre. In particular, the local data centre is connected to the wind farm via a local communication network, whereas the central data centre will typically be connected to the wind farm and/or to the local data centre via a global communication network, such as the Internet. The communication between the wind farm and the local data centre ensures that data can be transferred fast and reliably, i.e. with a low risk of data loss. Furthermore, typical data transfer times between the wind farm and the local data centre will normally be significantly lower than typical data transfer times between the wind farm and the central data centre.

Typically, each wind farm may have its own local data centre. Alternatively, the local data centre may be located in an area where multiple wind farms exist. In this case, all the wind farms in the area communicate with one local data centre. The local data centre may comprise more detailed information about the wind farm and each of the wind turbines comprised therein. The local data centre may be in communication with each wind turbine separately as well as with a plurality of instruments which may obtain various meteorological parameters related to the site, e.g. local met-masts or lidars.

Thus, site specific data in the form of site specific weather data and/or site specific wind turbine data is received at the local data centre. Accordingly, the local data centre is in the possession of the site specific forecast, which was received from the central data centre, and which is based on the global weather forecast data, as well as locally obtained site specific data.

Each device connected to the local data centre sends data to the local data centre. All these different data comprise site specific data, and are related to a site specific weather data and/or site specific wind turbine data. The site specific weather data may be measurements of wind speed, direction and rotation, measurements of pressure, temperature, humidity, and other relevant weather related parameters. The site specific wind turbine data are related to operation on the wind turbine of interest at the present moment, and could, e.g., include power production, load measurements, information regarding downtime of the wind turbines, etc.

The site specific data is then used to update the site specific forecast received at the local data centre from the central data centre. The local data centre may receive site specific data as often as needed. A frequency of site specific data does not need to follow frequency of the global weather forecast data. Typically, the site specific data is generated at a much higher frequency than the global weather forecast data, for instance at least every hour, and often as frequent as every 10 minutes, or every 2 to 5 minutes, or even every second. Accordingly, the updated site specific forecast has a much higher time resolution than the site specific forecast which was generated by the central data centre, and the updated site specific forecast takes locally obtained data into account.

Finally, a power production forecast of the wind turbine is generated based on the updated site specific forecast. Since the power production forecast is based on the updated site specific forecast, is has a time resolution which is as high as the time resolution of the updated site specific forecast, and it takes the locally obtained data into account. Thereby the power production forecast has a very high time resolution on the order of minutes and has higher accuracy than centrally produced site specific forecast.

Thus, the method according to the first aspect of the invention results in a power production forecast for the at least one wind turbine which is accurate and has a high time resolution. Furthermore, the high processing power requiring part of the process which includes generating a site specific forecast based on the global weather data takes place centrally, i.e. at the central data centre, whereas the part which takes the locally obtained data into account takes place locally. Thereby the locally obtained data needs not to be forwarded to the central data centre in order to take these into account, resulting in faster power forecast update time compared to a power forecast generated solely at the central data centre, since the site specific data need not be transferred from the site to the central data centre in real time in order to include these in the power forecast. By processing locally obtained data at the local data centre, data transfer time is significantly decreased, since the data only needs to be transferred locally. Accordingly, the time resolution of the final power production forecast is not limited by data transfer times between the site of the wind farm and the central data centre, and the only limitation on the time resolution of the power production forecast is the frequency at which the site specific data is provided. Thereby the power production forecast may even be generated in real time or almost in real time. Moreover, an accurate power production forecast with a high time resolution can be used to ensure the stability of the power grid. With the accurate power production forecast the power output of several power plants, e.g. wind, coal, solar power plants, can be coordinated, thereby allowing a grid operator to compensate for expected changes in the power production of the wind farm, and thereby ensure a stable power supply of the power grid. Eventually, site specific data may be collected and transferred to the central data centre, e.g. one time per day, or with a significant delay such that it loses value for use in short-term forecasting.

The local data centre may be arranged at the site of the wind farm. According to this embodiment, the local data centre is positioned within the geographical area where the wind farm is located. In this case the local data centre may even be regarded as forming part of the wind farm. As an alternative, the local data centre may be arranged outside the site of the wind farm, but in the vicinity thereof, or at least closer to the wind farm than the central data centre.

The step of generating the power production forecast of the at least one wind turbine may be performed by using a predefined transfer function. The predefined transfer function may be a mathematical function, a graph or a look up table, which represents a correlation between the weather data and the power production of the wind turbine. If the transfer function is a mathematical function, it is typically a nonlinear function involving a number of different parameters related to weather forecast and operation mode of the wind turbine. The transfer function is typically derived based on statistical and/or historical data related to wind turbine power production. The transfer function may include a large number of different coefficients related to, e.g., wind power, wind direction, wind speed at different levels and locations close to the wind turbine, precipitation, solar radiation, surface heat fluxes, outside temperature, humidity, pressure, wind turbine type and condition, etc. Input to the predefined transfer function may be the site specific weather data, the site specific wind turbine data, and/or a site specific power production forecast generated at the global data centre, and/or power curves for the wind turbine. Output of the predefined transfer function is typically a power production forecast of the at least one wind turbine. The predefined transfer function may be executed at a computer unit being part of the local data centre. Having the predefined transfer function ease a forecasting of the power production in a wind farm or wind turbine as only one or a few parameters are required as an input.

According to one embodiment, the predefined transfer function may be generated based on historical data of the at least wind turbine within an appointed time period. Historical data may include data related to past power production under certain weather conditions. These data may be gathered over the appointed time period such as one week, one month, one year, or several years. The data may be constantly updated with new data, creating a dynamic transfer function and therefore improving the accuracy of the transfer function. The data may form a look up table which may serve as the predefined transfer function. Input for the table may be weather parameters. The weather parameters may be mapped on the weather data existing in the look up table in order to determine a corresponding power production. The corresponding power production may be determined by extrapolation or by direct translation of weather data to the power production data. By generating the predefined transfer function based on historical data the power production forecast accuracy is improved. Furthermore, the longer the appointed time period is the higher average forecast accuracy can be achieved.

The step of generating a site specific forecast may comprise generating a site specific weather forecast, the step of updating the site specific forecast at the local data centre may comprise updating the site specific weather forecast, and the step of generating a power production forecast for the at least one wind turbine may be performed on the basis of the updated site specific weather forecast. According to this embodiment, a site specific weather forecast is generated at the central data centre, based on the global weather forecast data and possibly on additional parameters related to the site, and this site specific weather forecast is sent to the local data centre. The site specific weather forecast is then be updated at the local data centre by site specific weather data to obtain more accurate and detailed site specific weather forecast with a higher time resolution. The updated site specific weather data may be used as an input for a predefined transfer function and thereby translated into the power production forecast for the wind turbine arranged at the site.

Alternatively, the step of generating a site specific forecast may comprise generating a site specific power production forecast at the central data centre. According to this embodiment, a site specific power production forecast is generated at the central data centre, based on the global weather data, and sent to the local data centre. In this case the global weather data may be used as an input to a predefined transfer function in order to obtain the site specific power production forecast of the wind turbine arranged at the site. Having generated the site specific power production forecast a rough estimate of the power production forecast is generated. This rough estimate is then updated, using the site specific data, at the local data centre.

The step of generating a site specific power production forecast at the central data centre may comprise generating a site specific weather forecast, based on the global weather forecast data, and generating a site specific power production forecast, based on the site specific weather forecast. According to this embodiment, the site specific power production forecast is generated at the central data centre by first generating a site specific weather forecast, based on the global weather data, and then generating a site specific power production forecast, based on the site specific weather forecast. The site specific power production forecast is then sent to the local data centre. In this case the site specific weather forecast may be input to a transfer function in order to obtain the site specific power production forecast. It is not ruled out that the site specific weather forecast is sent to the local data centre along with the site specific power production forecast.

The global weather forecast data may be received at the central data centre at least every 6 hours, i.e., at least four times per day. This is a typical time period in which commercial or public meteorology centres send updates about weather forecast which may provide a satisfactory starting point in forecasting power production of a wind turbine. Alternatively, the global weather forecast data may be received more frequently, such as every 5 hours, such as every 4 hours, or such as every 3 hours. Having the global weather forecast data updated at least four times per day a more precise site specific weather forecast can be obtained. Additionally, one set of the global weather forecast data received in at least 6 hours may be used for calculating at least two site specific weather forecast.

The power production forecast of the at least one wind turbine is typically a forecast of expected power generated by the at least one wind turbine operating under optimal conditions. The optimal conditions imply expected functioning of the rotor, wind turbine blades, gearbox, and other wind turbine components responsible for conversion of mechanical wind energy into electrical energy. Unpredictable conditions in the wind turbine behaviour which are not foreseen under any circumstances may not be accounted when forecasting the power production. The same stands for unpredictable changes in weather and wind conditions.

The site specific wind turbine data may comprise information related to current power output of one or more wind turbines of the wind farm, temperature measurements of one or more wind turbines of the wind farm, rotor speed of one or more wind turbines of the wind farm, and/or pitch angle of wind turbine blades of one or more wind turbines of the wind farm. The site specific wind turbine data may reflect operational conditions of the corresponding wind turbine which, on the other hand, may influence power production to a great extent. These parameters may be used as an input to the predefined transfer function and contribute to the accuracy of the forecasted power production of the corresponding wind turbine.

The site specific wind turbine data may include information regarding scheduled wind turbine maintenance for one or more wind turbines of the wind farm. If wind turbine maintenance is scheduled the wind turbine will be non-operational for a certain time period in which the maintenance is scheduled to take place, and therefore the wind turbine will not provide any power during this time period, regardless of the weather conditions. Since planned maintenance windows for wind turbines are normally known, such non-operational time periods may advantageously be taken into account when power production is forecasted.

According to one embodiment of the invention, the method may further comprise the step of operating one or more wind turbines of the wind farm in accordance with the generated power production forecast. Typically, the wind turbine will generate an amount of power which is equal to the forecasted value. In case that the wind turbine tends to produce more power than forecasted, the control unit may derate the wind turbine, i.e. control the wind turbine to cause a decrease in produced power generated such that the generated power matches the forecast. This may, e.g., be performed by controlling the pitch angle of the wind turbine blades. By operating the wind turbine in accordance to the forecasted power production a power grid which the wind turbine is connected to will receive 'promised' energy and will therefore function as expected and without any excess or missing amount of energy.

The method may further comprise the step of generating a power forecast for the wind farm by aggregating power production forecasts from all wind turbines of the wind farm. Each wind turbine comprised in the wind farm may have a forecasted power production as the wind farm may extend over a large area across which wind currents are different. Each wind turbine may then have its own wind forecast and wind turbine specific data, which differ from one wind turbine to another. The total power generated by the wind farm is typically a sum of the forecasted powers of all the wind turbines comprised in the wind farm. By forecasting the total power of the wind farm in this way a more accurate forecasted total power is obtained.

The method may further comprise the step of operating the wind farm in accordance with the generated power forecast for the wind farm. This may happen if one or more wind turbines comprised in the wind farm does not produce power equal to the forecasted value. This can be dealt with in the same manner as it is described above, for one wind turbine. As described above, when operating the wind turbine in accordance to the forecasted power, the power grid which the wind farm is connected to will receive power as expected.

The wind farm may be operated to generate 90-100% of the forecasted power production of the generated power forecast for the wind farm. By operating the wind farm to produce more than 90% of the forecasted power, the power grid which the wind farm is connected to would not experience any unexpected circumstances. By operating the wind farm to generate, e.g., 95% of the forecasted power, the forecasted power can be delivered even if the wind speed falls below the forecasted value, which may be expected, as well as in case of small wind speed variations around the forecasted value. Thus, in order to ensure the stability of the grid a stable power output can be provided in this way.

According to a second aspect, the invention provides a system comprising a wind farm arranged at a site, the wind farm comprising at least two wind turbines, a central data centre being arranged remotely from the site of the wind farm, and a local data centre, the central data centre being configured to receiving global weather forecast data, generating a site specific forecast based on the global weather forecast data, and sending the site specific forecast from the central data centre to the local data centre, the site specific forecast being a site specific weather forecast and/or a site specific power production forecast related to the site of the wind farm;

the local data centre being configured to receiving site specific data, the site specific data comprising site specific weather data and/or site specific wind turbine data measured at the site, the local data centre being further configured to updating the site specific forecast, using the site specific data; and the system being configured to generating a power production forecast of the at least one wind turbine based on the updated site specific forecast.

Having the local data centre arranged locally with respect to the site of the wind farm relaxes requirements for the system to operate efficiently, reliably and without any delays. Accordingly, the system according to the second aspect of the invention is capable of generating power production forecasts which are accurate and have a high time resolution, as described above with reference to the first aspect of the invention.

The system according to the second aspect of the invention may advantageously be capable of performing the method according to the first aspect of the invention. It is thus, noted that a skilled person would readily recognise that any feature described in combination with the first aspect of the invention could also be combined with the second aspect of the invention, and vice versa. Any remarks set forth above with reference to the first aspect of the invention are therefore equally applicable here.

As described above, the local data centre may be arranged at the site of the wind farm.

BRIEF DESCRIPTION OF THE DRAWINGS

The invention will now be described in further detail with reference to the accompanying drawings in which.

DETAILED DESCRIPTION OF THE DRAWINGS

Figure 1:
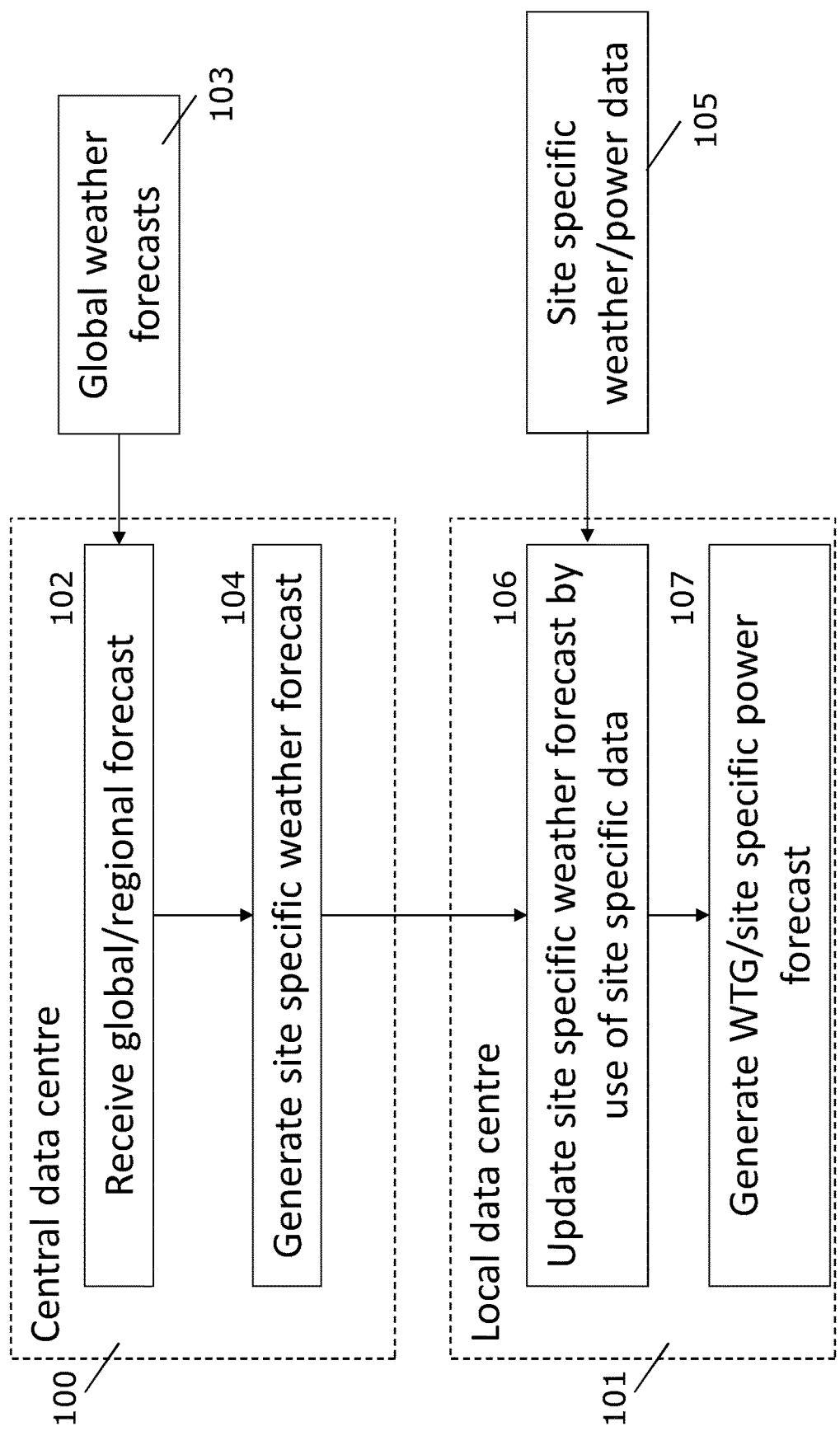
FIG. 1 shows a schematic diagram illustrating a method for forecasting power production of one wind turbine according to a first embodiment of the first aspect of the invention.

FIG. 1 shows a schematic diagram of illustrating method for forecasting power production of one wind turbine according to a first embodiment of the invention. The wind turbine forms part of a wind farm arranged at a site. A central data centre 100 is arranged remotely from the site, while a local data centre 101 is arranged at the site of the wind farm. In the first step 102 the central data centre 100 receives global or regional weather forecast data, e.g. in the form of one or more global weather forecasts, from at least one global weather forecast centre 103. The central data centre 100 then, in the next step 104, generates a site specific weather forecast based on the global or regional weather forecast data. The site specific weather forecast relates to the site of the wind farm. The site specific weather forecast generated at the central data centre 100 in step 104 is then sent to the local data centre 101. The local data centre 101 also receives site specific data 105. The site specific data 105 comprises site specific weather data and/or site specific power data related to the wind turbine. As a first step 106, the local data centre 101 updates the site specific weather forecast using the site specific data 105, thereby obtaining an updated site specific weather forecast. In the last step 107 of the method, the local data centre 101 generates a wind turbine power production forecast, based on the updated site specific weather forecast.

Figure 2:
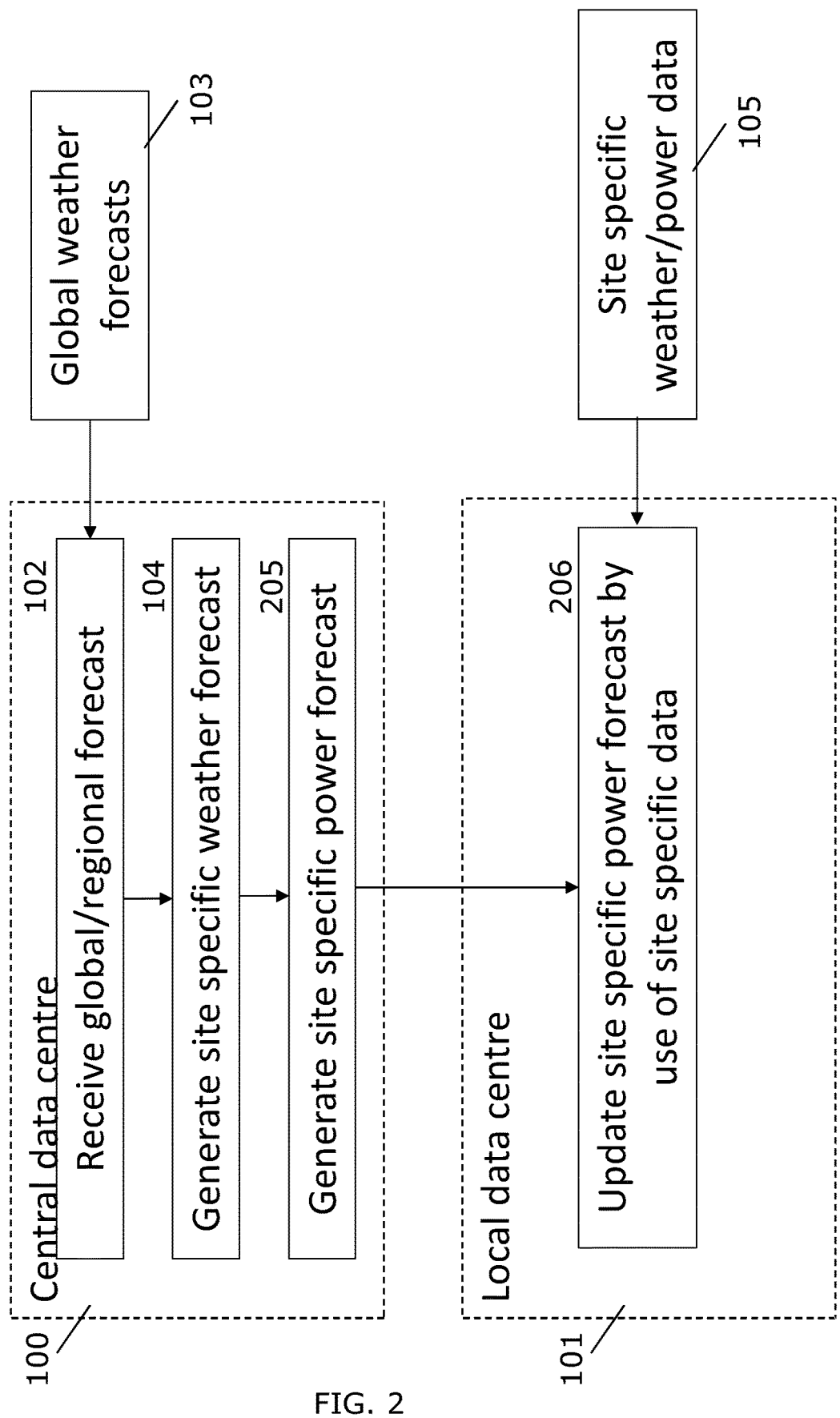
FIG. 2 shows a schematic diagram illustrating a method for forecasting power production of one wind turbine according to a second embodiment of the first aspect of the invention.

FIG. 2 shows a schematic diagram illustrating a method for forecasting power production of one wind turbine according to a second embodiment of the invention. As in the first embodiment, the wind turbine forms part of a wind farm arranged at a site. A central data centre 100 is arranged remotely from the site, while a local data centre 101 is arranged at the site of the wind farm. In the first step 102 the central data centre 100 receives global or regional weather forecast data from at least one global weather forecast centre 103. The central data centre 100 then, in the next step 104, generates a site specific weather forecast based on the global or regional weather forecast data. Further, the central data centre 100, in the step 205, generates a site specific power forecast based on the site specific weather forecast. The site specific power forecast generated at the central data centre 100 in the step 205 is then sent to the local data centre 101. The local data centre 101 also receives site specific data 105. The site specific data 105 comprises site specific weather data and/or site specific power data related to the wind turbine. As a final step 206 of the method, the local data centre 101 updates the site specific power forecast using the site specific data 105, based on the site specific data.

Figure 3:
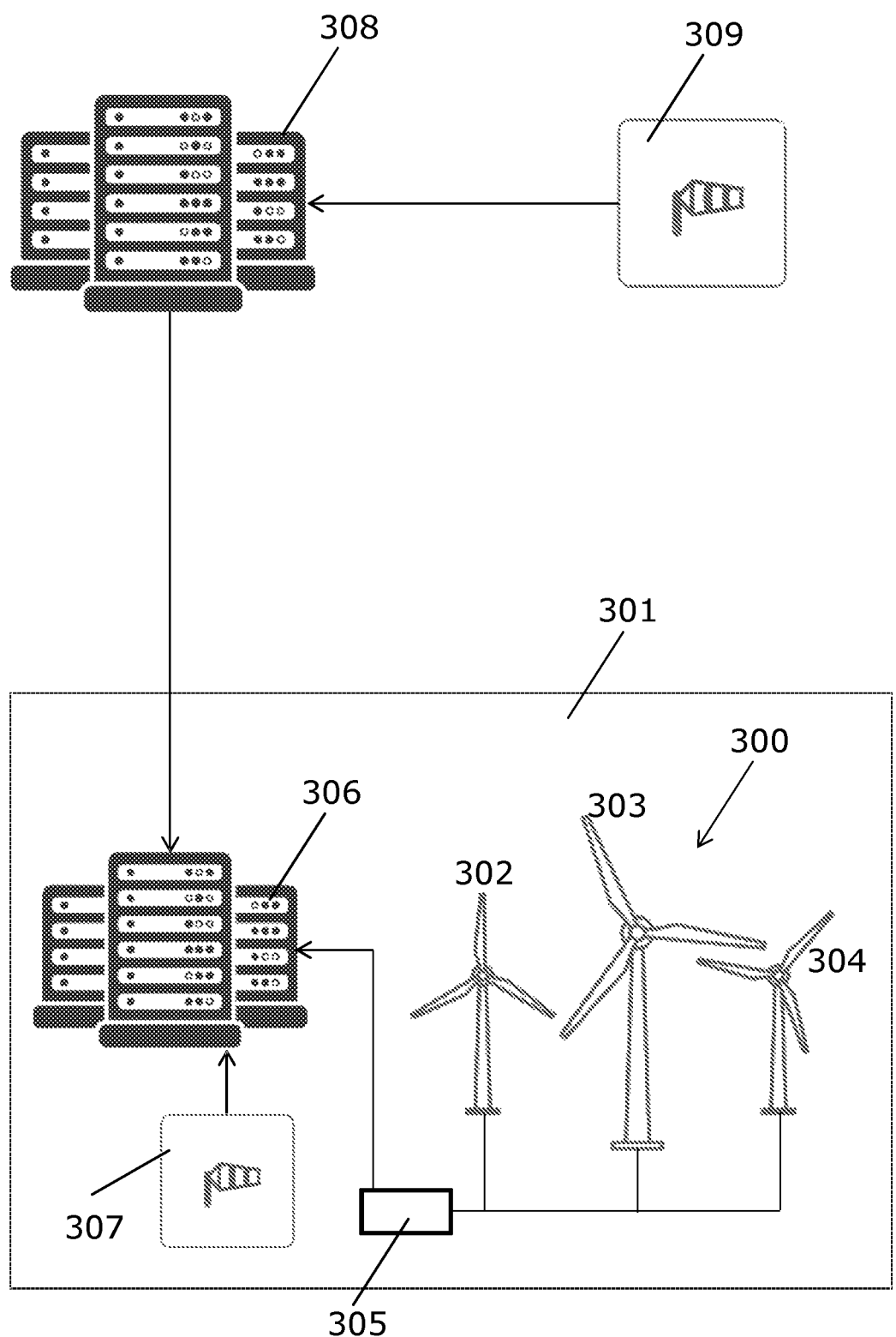
FIG. 3 shows a system according to an embodiment of the invention.

FIG. 3 shows a system according to an embodiment of the invention. The system performs the method described in FIGS. 1 and 2. The system comprises a wind farm 300 arranged at a site 301. The wind farm 300 comprises at least two wind turbines, and the figure shows three turbines 302-304. The wind farm 300 further comprises a control unit 305 being in communication with all the wind turbines 302-304 arranged at the site 301. A local data centre 306 is also arranged at the site 301 and is configured to receive data from the control unit 305. The local data centre 306 is also configured to receive, weather forecast data related to the site 301 from a local meteorology centre 307, i.e., a site specific weather forecast data. The local meteorology centre 307 generates the site specific data.

A central data centre 308 is arranged remotely from the site 301 of the wind farm 300. The central data centre 308 is configured to receiving global weather forecast data from at least one global meteorology centre 309. Once the global weather forecast data is received, the central data centre 308 generates a site specific forecast based on the global weather forecast data, and sends the site specific forecast from the central data centre 308 to the local data centre 306. The site specific forecast is a site specific weather forecast and/or a site specific power production forecast related to the site 301 of the wind farm 300. In an alternative embodiment, the central data centre 308 may generate only the site specific weather forecast while the site specific power production forecast will be generated by the local data centre 306.

The local data centre 306 is configured to receiving site specific data and to updating the site specific forecast, using the site specific data received from the control unit 305 and the local meteorology centre 307. The local data centre 306 finally generates a power production forecast of the at least one wind turbine based on the updated site specific forecast.

In one embodiment, each of the wind turbines 302-304 of the wind farm 300 may have its own control unit 305. Each of the control units 305 would then be individually connected to the local data centre 306. Further, the local data centre 306 may generate a power forecast for the wind farm 300 by aggregating power production forecasts from all wind turbines 302-304 arranged at the wind farm 300.

As described above, the system of FIG. 3 is capable of generating power production forecasts for the wind turbines of the wind farm 300, which are accurate and have a very high time resolution, because the part of the process which involves handling of global weather forecast data is performed at the central data centre 308, while the part of the process which takes locally obtained data into account is performed at the local data centre 306.

The invention claimed is:

1. A method for forecasting power production of at least one wind turbine, the wind turbine forming part of a wind farm arranged at a site, the method comprising:
    receiving global weather forecast data at a central data centre, the central data centre being arranged remotely from the site of the wind farm;
    receiving site specific data at a local data centre arranged at the site of the wind farm, the site specific data comprising at least one of site specific weather data or site specific wind turbine data measured at the site;
    generating a site specific forecast at the central data centre, based on the global weather forecast data but not the site specific data, the site specific forecast being at least one of a site specific weather forecast or a site specific power production forecast related to the site of the wind farm;
    sending the site specific forecast from the central data centre to the local data centre;
    updating the site specific forecast at the local data centre using the site specific data such that the updated site specific forecast has a higher time resolution than the site specific forecast; and
    generating a power production forecast of the at least one wind turbine based on the updated site specific forecast.

2. The method of claim 1, wherein generating a power production forecast of the at least one wind turbine is performed by using a predefined transfer function.

3. The method of claim 2, wherein the predefined transfer function is generated based on historical data of the at least one wind turbine within an appointed time period.

4. The method of claim 1, wherein generating a site specific forecast comprises generating a site specific weather forecast, wherein updating the site specific forecast at the local data centre comprises updating the site specific weather forecast, and wherein generating a power production forecast for the at least one wind turbine is performed on the basis of the updated site specific weather forecast.

5. The method of claim 1, wherein generating a site specific forecast comprises generating a site specific power production forecast at the central data centre.

6. The method of claim 5, wherein generating a site specific power production forecast at the central data centre comprises generating a site specific weather forecast, based on the global weather forecast data, and generating a site specific power production forecast, based on the site specific weather forecast.

7. The method of claim 1, wherein the global weather forecast data are received at the central data centre at least every 6 hours.

8. The method of claim 1, wherein the power production forecast of the at least one wind turbine is a forecast of expected power generated by the at least one wind turbine operating under optimal conditions.

9. The method of claim 1, wherein the site specific wind turbine data comprises information related to at least one of current power output of one or more wind turbines of the wind farm, temperature measurements of one or more wind turbines of the wind farm, rotor speed of one or more wind turbines of the wind farm, or pitch angle of wind turbine blades of one or more wind turbines of the wind farm.

10. The method of claim 1, wherein the site specific wind turbine data include information regarding scheduled wind turbine maintenance for one or more wind turbines of the wind farm.

11. The method of claim 1, wherein the method further comprises operating one or more wind turbines of the wind farm in accordance with the generated power production forecast.

12. The method of claim 1, wherein the method further comprises generating a power forecast for the wind farm by aggregating power production forecasts from all wind turbines of the wind farm.

13. The method of claim 12, wherein the method further comprises operating the wind farm in accordance with the generated power forecast for the wind farm.

14. The method of claim 13, wherein the wind farm is operated to generate 90-100% of the forecasted power production of the generated power forecast for the wind farm.

15. A system, comprising:
- at least two wind turbines of a wind farm at a site;
- a central data centre being arranged remotely from the site; and
- a local data centre arranged at the site and configured to perform a second operation comprising receiving site specific data comprising at least one of site specific weather data or site specific wind turbine data measured at the site;
- wherein the central data centre is configured to perform a first operation, comprising:
  - receiving global weather forecast data;
  - generating a site specific forecast based on the global weather forecast data but not the site specific data; and
  - sending the site specific forecast from the central data centre to the local data centre, the site specific forecast being at least one of a site specific weather forecast or a site specific power production forecast related to the site of the wind farm;
- wherein the second operation further comprises:
  - updating the site specific forecast, using the site specific data such that the updated site specific forecast has a higher time resolution than the site specific forecast; and
- the system being configured to generate a power production forecast of the at least two wind turbines based on the updated site specific forecast.

16. A method for forecasting power production of at least one wind turbine, the wind turbine forming part of a wind farm arranged at a site, the method comprising:
- receiving global weather forecast data at a central data centre, the central data centre being arranged remotely from the site of the wind farm;
- receiving site specific data at a local data centre arranged at the site of the wind farm, the site specific data comprising at least one of site specific weather data or site specific wind turbine data measured at the site;
- generating a site specific forecast at the central data centre, based on the global weather forecast data but not the site specific data, the site specific forecast being at least one of a site specific weather forecast or a site specific power production forecast related to the site of the wind farm;
- sending the site specific forecast from the central data centre to the local data centre, wherein the local data centre is arranged at the site of the wind farm;
- receiving site specific data at the local data centre, the site specific data comprising site specific weather data and/or site specific wind turbine data measured at the site;
- updating the site specific forecast at the local data centre using the site specific data such that the updated site specific forecast has a higher time resolution than the site specific forecast; and
- generating a power production forecast of the at least one wind turbine by using a predefined transfer function and based on the updated site specific forecast.

* * * * *